United States Patent
Michel et al.

(10) Patent No.: US 6,215,562 B1
(45) Date of Patent: Apr. 10, 2001

(54) VISUAL CALIBRATION

(75) Inventors: Paul Michel, Redwood City; Ramin Samadani, Menlo Park, both of CA (US)

(73) Assignee: Electronics for Imaging, Inc., Foster City, CA (US)

( * ) Notice: Subject to any disclaimer, the term of this patent is extended or adjusted under 35 U.S.C. 154(b) by 0 days.

(21) Appl. No.: 09/215,575

(22) Filed: Dec. 16, 1998

(51) Int. Cl.⁷ .................................................. G06F 15/00
(52) U.S. Cl. .......................... 358/1.9; 358/407; 358/406; 382/167
(58) Field of Search .......................... 358/1.9, 467, 406, 358/405, 401; 382/167

(56) References Cited

U.S. PATENT DOCUMENTS

| | | | |
|---|---|---|---|
| 2,790,844 | 4/1957 | Neugebauer . | |
| 4,275,413 | 6/1981 | Sakamoto et al. | 358/80 |
| 4,310,248 | 1/1982 | Meredith | 356/402 |
| 4,500,919 | 2/1985 | Schreiber | 358/78 |
| 4,841,360 | 6/1989 | Birgmeir | 358/80 |
| 5,062,013 | 10/1991 | Gotoh | 360/90 |
| 5,107,332 | 4/1992 | Chan | 358/80 |
| 5,148,288 | 9/1992 | Hannah | 358/298 |
| 5,157,506 | 10/1992 | Hannah | 358/298 |
| 5,227,815 | 7/1993 | Dastin et al. | 346/160 |
| 5,285,297 | 2/1994 | Rose et al. | 358/518 |
| 5,305,119 | 4/1994 | Rolleston et al. | 358/522 |
| 5,363,318 * | 11/1994 | MCauly | 364/571.01 |
| 5,384,592 | 1/1995 | Wong | 346/157 |
| 5,416,613 | 5/1995 | Rolleston et al. | 358/518 |
| 5,450,114 | 9/1995 | Barry | 347/116 |
| 5,452,403 * | 9/1995 | Miller | 395/109 |
| 5,471,324 | 11/1995 | Rolleston | 358/518 |
| 5,483,360 | 1/1996 | Rolleston et al. | 358/518 |
| 5,528,386 | 6/1996 | Rolleston et al. | 358/522 |
| 5,537,190 | 7/1996 | Folkins et al. | 355/214 |
| 5,594,557 | 1/1997 | Rolleston et al. | 358/518 |
| 5,598,272 | 1/1997 | Fisch et al. | 358/298 |
| 5,604,567 | 2/1997 | Dundas et al. | 399/39 |
| 5,652,831 | 7/1997 | Huang et al. | 395/131 |
| 5,689,350 | 11/1997 | Rolleston | 358/504 |
| 5,710,824 * | 1/1998 | Mongeon | 382/162 |
| 5,809,366 | 9/1998 | Yamakawa et al. | 399/39 |
| 5,854,882 * | 12/1998 | Wang | 395/109 |
| 5,923,774 * | 7/1999 | Ostromoukhov | 382/162 |
| 5,995,714 | 11/1999 | Hadley et al. | 395/109 |
| 6,067,406 * | 5/2000 | Van Hoof et al. | 395/109 |

FOREIGN PATENT DOCUMENTS

| | | | |
|---|---|---|---|
| 0647061A1 | 4/1995 | (EP) | H04N/1/60 |
| 772 116A1 | 5/1997 | (EP) | G06F/3/12 |
| 92/01264 | 1/1992 | (WO) | G06F/15/62 |
| WO 99/20036 | 4/1999 | (WO) | H04N/1/60 |

* cited by examiner

*Primary Examiner*—Jerome Grant, II
*Assistant Examiner*—Kevin Kianni
(74) *Attorney, Agent, or Firm*—Michael A. Glenn

(57) ABSTRACT

A calibration apparatus and method for a color printer that allows a user to calibrate a printer without the use of expensive measuring instruments and prior user training is provided. The calibration process prints out two target layouts. On the first target the user selects the primary inks start and end points (highlights and shadows), and the black ink only input value that generates a 30% gray. The primary inks are the device-dependent colorants, cyan, magenta and yellow. The second target compares the 30% black ink with grays made of a combination of cyan, magenta and yellow inks. The user selects the best match in an iterative process. Using this data, calculations are made of the corrections to the original input signal values for the printer. A look up table is updated with corrected input values to compensate for the printer deviation from its standard behavior.

29 Claims, 6 Drawing Sheets

(To Fig. 3B)

VISUAL CALIBRATION

BACKGROUND OF THE INVENTION

1. Field of the Invention

The invention relates to the calibration of a color printer. More particularly, the invention relates to a calibration apparatus and method for a color printer, where the calibration is performed in such a way that prior training and expensive equipment are not required.

2. Description of Prior Art

Many printing technologies, including electrophotographic and ink jet technology, are complex and, due to many different physical and environmental factors, may drift in their color response, i.e. the amount of color toner or ink that is printed on a paper. That is, a particular combination of input colorants to the printer, cyan, magenta, yellow, and black, or (c,m,y k), results in a different color response when printed to one printer at different times or when printed to different printers of the same model. Preferably, the color response should be steady through time and consistent between different devices. Prior art systems attempt to compensate for the difference in color behavior of the measured response of the printer and the goal response by various calibrating techniques.

Users currently calibrate a printer or copier using a densitometer or a scanner. For purposes of the invention described herein, calibration means adjustments to single toner or ink values, through one-dimensional lookup tables, to provide for steady, predictable color printing. This document describes the goals, techniques and a proposed development plan for a calibration system that involves neither a densitometer nor a scanner but that uses visual comparisons by an untrained user.

For a general description of the process of generating color documents, refer to R. J. Rolleston, Color Printer Calibration Method For Accurately Rendering Selected Colors, U.S. Pat. No. 5,689,350, Nov. 18, 1997 and R. J. Rolleston et al., Color Printer Calibration Test Pattern, U.S. Pat. No. 5,416,613, May 16, 1995, in which the word calibration in the titles preceding do not mean calibration in the sense of the invention. In one approach, the generation of color documents can be thought of as a two step process: first, the generation of the image by means of scanning an original document with a color image input terminal or scanner or, creating a color image on a workstation; and secondly, printing of the image with a color printer in accordance with the colors defined by the scanner or computer generated image. Scanner output is commonly transformed to a color space of calibrated RGB (red-green-blue). In another approach, computer generated images can be defined initially in the color space of calibrated RGB. These colors are defined independently of any particular device and are referred to as device independent.

Most methods for calibration in the sense of the invention involve the use of possibly expensive instruments such as densitometers or scanners to measure the color response of the printer in comparison with a goal response, the color response and the goal response expressed in terms of density. In the methods an algorithm may be used to compensate for the difference in color behavior of the measured response of the printer and the goal response. Similarly, many methods for calibration require the use of highly trained operators. As described in the PCT Patent Application No. WO 92/01264, one such prior art system is employed by certain systems typically used in professional preprint shops. In this case, the user specifies a small number of aim points (usually three or four) on an image and controls the colors at those points. A major disadvantage of this method is that the process of specifying the aim points requires a highly trained operator.

A second prior art system also described in the PCT Patent Application No. WO 92/01264, is used by desktop computer scanning programs. Here, the user has control over a few parameters, such as brightness and contrast that control a mapping of the colors seen by the scanner. Again, a major disadvantage is this process requires a user with a significant amount of training.

A third prior art method described in PCT Patent Application No. WO 92/01264, is device dependent because it requires the scanner to measure the colors on the sheet. The resulting calibration is for the combination of scanner and printer, rather than for the printer itself. This method has some significant limitations. For example, this method does not allow a way to accurately display or print computer rendered images, i.e. images that do not originate as scanned images but rather are originally generated by the computer.

Instrument-based calibration is driven by measurements from instruments. Instrument based calibration leads to consistent results because the human factor is minimized. The time it takes to calibrate and the quality of the results are predictable. Although custom calibration goals need to be prepared by a skilled operator, a minimally trained operator can perform a very good calibration.

Human vision based calibration is also possible (see, for example, P. Engeldrum, W. Hilliard, Interactive Method and System for Color Characterization and Calibration of Display Device, U.S. Pat. No. 5,638,117 (Jun. 10, 1997)). Vision based calibration relies on the subjective perception by the human eye. Visual based calibration leads to more variable results than instrument based calibration. However, if designed well, the calibration process can be performed rapidly and can require much less data from the targets. If operator-oriented, the human is usually the less controllable element in the printing and evaluating workflow. The quality of calibration can vary from one operator to another.

P. Dundas, D. Temple, S. Zoltner, Printer Color and Gray Balance Adjustment System, U.S. Pat. No. 5,604,567 (Feb. 18, 1997), describes a gray balancing approach to copier or printer adjustment. Dundas discloses a technique that allows for printing of multi-colored pages to be used for visual comparisons. The disclosed technique works in conjunction with specific engine adjustments and controls (developer charge control, as an example) but does not generate digital transfer curves for printer control and therefore does not provide a uniform interface across printer models and technologies. In addition, Dundas does not minimize the iterations needed and does not maximize the accuracy of the calibration in highlights and gray balance.

It would be wrong, however, to conclude that instrument based is always a better choice than visual based calibration:

Instruments cost money. The user may want good color quality, but may not be ready to purchase a densitometer, that is more expensive than many low end printers, preexisting reference targets.

Instruments can deliver unreliable results. Some low-end printers are incapable of producing the same color across the page. Tints and solids may not print at the same density across the page. Hence a densitometer may measure very precisely an incorrect value due to the location of the sample, whereas an operator naturally compensates for such problems.

Papers can be unreliable. Very often, lower quality papers are irregular in thickness and coating. Printed results can therefore vary widely, affecting densitometer measurements.

An operator could feed the printer with a different paper than that expected by the calibration system. Also, an operator may not notice a certain spot on a specific sheet of paper where a sample is measured. This happens often because the operator has too much confidence in the densitometer and is less prone to verify his work.

No calibration method is known that allows for visual calibration to arbitrary color response goals or different settings.

SUMMARY OF THE INVENTION

The invention provides a calibration apparatus and method that allows a user to calibrate a printer without having prior training and without the use of expensive measuring instruments. The invention is also compatible with densitometer calibration. The invention does not require specially preprinted targets, which can be costly and difficult to manufacture, and which can fade over time. The invention allows for calibration to arbitrary color response goals such as, for example, goals from a print device or presses that use DIC inks or SWOP inks. The goals could be generated from an ICC. The preferred embodiment of the invention compensates for the drift in color response of printers by making visual comparisons of prints made by a printer to be calibrated. The process is iterative and therefore can be made as good as desired in the sense of coarse or fine iterations. The end result of the calibration process is a set of four curves or one-dimensional lookup tables that modify the behavior of color toners or inks for cyan, magenta, yellow, and black of the printer to provide for steady, predictable color printing. This process of applying four curves or one-dimensional lookup tables works well in practice, and in theory works perfectly well when the mixture properties of the color toner or inks do not change and only the amount of color toner or single inks needs modification. Also, errors generated by the invention are of a kind that can be readily detected and easily corrected. That is, even if a mistake is made, the mistake can be remedied easily. Because the invention comprises visual comparisons, intelligent variations for the goal toner or ink densities generated by a user can be used to correct an error.

DETAILED DESCRIPTION OF INVENTION

Figure 1:
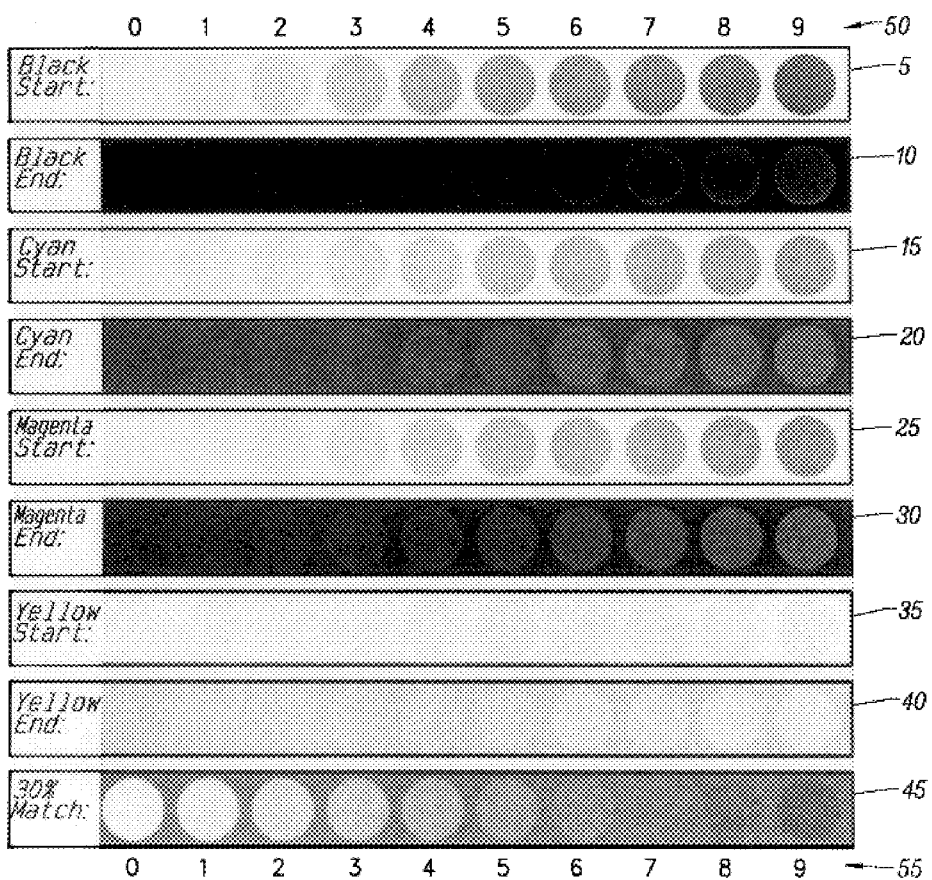
FIG. 1 is a first target layout, referred to as the "Limits page," according to the invention.

The invention provides a calibration apparatus and method that allows a user to calibrate a printer without having prior training and without the use of expensive measuring instruments. The invention is also compatible with densitometer calibration. The invention does not require special preexisting reference targets, which can be costly and difficult to manufacture, and which can fade over time. The invention allows for calibration to arbitrary color response goals such as, for example, goals from a print device or presses that use DIC ink or SWOP inks. The goals could be generated from an ICC (International Color Consortium) profile. The preferred embodiment of the invention compensates for the drift in color response of printers by making visual comparisons of prints made by a printer to be calibrated. The process is iterative and therefore can be made as good as desired in the sense of coarse or fine iterations. The end result of the calibration process is a set of four curves or one-dimensional lookup tables that modify the behavior of color toners or inks for cyan, magenta, yellow, and black of the printer to provide for steady, predictable color printing. This process of applying four curves or one-dimensional lookup tables works well in practice, and in theory works perfectly well when the mixture properties of the color toner or inks do not change and only the amount of color toner or single inks needs modification. Also, errors generated by the invention are of a kind that can be readily detected and easily corrected. That is, even if a mistake is made, the mistake can be remedied easily. Because the invention comprises visual comparisons, intelligent variations for the goal toner or ink densities generated by a user can be used to correct an error.

There are several methods of visual calibration including, for example gray-balance methods (where mixed toner or ink grays are compared to single toner or ink grays), variations (where a user selects a preferred print from prints that differ in some color aspect), and absolute reference methods (where carefully controlled preexisting reference targets consisting of, for example, single toner or ink patches are compared with current printouts). The presently preferred embodiment of the invention uses the gray-balance solution. There are two basic parts to the gray balance method. The first determines the toner or ink response (toner or ink densities) of the printer in question. The second determines the combinations of mixed toners or inks that yield gray.

It is necessary to understand some mathematical preliminaries that show how visual comparisons of three color grays (c,m,y) with single color k grays can be used to generate four calibration functions, $f_c$, $f_m$, $f_y$, and $f_k$. Assume an ideal density response of a printing device is known and is defined by four functions $g_c(c)$, $g_m(m)$, $g_y(y)$, and $g_k(k)$. The arguments to the functions represent input toner or ink values normalized between zero (no toner or ink) and one (full toner or ink). Assume the current response of the device is given by $h_c(c)$, $h_m(m)$, $h_y(y)$, and $h_k(k)$. If modified input toner or ink values, e', m', y' and k', are supplied to the engine, so that e'=$f_c(c)$, m'=$f_m(m)$, y'=$f_y(y)$ and k'=$f_k(k)$, the drifts in the printing device can be compensated.

The goal is to find the functions $f_c$, $f_m$, $f_y$, and $f_k$ that compensate the printing device. In particular for example for cyan, $$h_c(c')=h_c(f_c(c))=g_c(c).$$

Solving the equation above yields $$f_c(c)=h^\dagger_c(g_c(c)).$$

The symbol $h^\dagger_c$ refers loosely to a pseudo-inverse in the sense that it is the inverse function for $h_c$ if it is invertible, and an approximation of the inverse if the function is not invertible. Proceeding similarly for the other toners or inks, the calibrating solution is summarized as follows:

$$f_c(c)=h^\dagger_c(g_c(c))$$

$$f_m(m)=h^\dagger_m(g_m(m))$$

$$f_y(y)=h^\dagger_y(g_y(y))$$

$$f_k(k)=h^\dagger_k(g_k(k))$$

Assume now that $f_k$ is known. Furthermore, assume that there is an equivalence relation (c,m,y)=k for all k in [0,1] that holds for the desired goal for the device. This means that visually the colors are identical given that the ideal response of the printer (defined as four functions, $g_c$, $g_m$, $g_y$, and $g_k$) for the device is known. Suppose first the black channel is compensated for by k'=$f_k$(k). Then, another equivalence relation holds, (c',m',y')=k'. Because the visual responses of k' and k are equivalent by definition, then for each c, the equivalent c' that corresponds to it is found. Similarly, for each m, the equivalent m' that corresponds to it is found, and for each y, the equivalent y' that corresponds to it is found. In other words, the functions for $f_c$, $f_m$, $f_y$ are determined by matching three color grays to single color grays.

The calibration process of the preferred embodiment prints two target layouts from the operation panel of a printer. The first target, referred to herein as the "Limits page," provides the basis for calculating the most acceptable lightness response of the toners or inks. This page contains rows of C,M,Y, and K and circular patches (although the patches need not be circular) in a graduated range of single toner or ink densities. The variables needed to recalculate the values of the colored toners or inks are determined by identifying the leftmost patches that can be distinguished against their fields in each row. Their corresponding numeric values are entered on a control panel of a printer. The toner or ink response of the black toner or ink is determined by identifying the black patch which best matches a certain percentage black background printed with a coarse pattern.

When all values have been entered, the printer's toner or ink tone response can be recalculated.

Referring to FIG. 1, the presently preferred embodiment of the Limits page, the primary inks start and end points are determined. For each row in the Limits page, 5, 10, 15, 20, 25, 30, 35, and 40, the user locates the leftmost patch that can be distinguished from its background. Very light dots are printed in gradation on a paper white background for start points. The user selects the lightest toner or ink value that can be distinguished from the paper white. The presently preferred values are displayed in the first and last rows, 50 and 55. This is done for every primary toner or ink to determine the start points. Very dense patches of toner or ink are printed in gradation against a denser (100%) background. The user selects the darkest toner or ink value that can be distinguished from the dense background. This is done for every primary toner or ink to determine the end points of this correction functions. Rows 5 and 10 are black, rows 15 and 20 are cyan, rows 25 and 30 are magenta, and rows 35 and 40 are yellow. The user can select two out of range values for color calibration, presently 0 and 9 displayed in 50 and 55. If any of the selected values are the out of range values, the Limits page may be regenerated with a modified test pattern closer to the specific printer response and reprinted automatically.

Determining the primary toners or inks start points is necessary because for example four percent of a toner or ink may not be printed, whereas as little as one percent of another primary toner or ink, or of the same toner or ink but at a different point in time may be printed. Many factors can cause this such as the subtle color of a paper, the color of the illuminant, the wear on a printer, or a printer's correct or deficient adjustment. Determining the primary toners or inks end points is also necessary because for example 90% of an ink may not visually be different from 100% of the same ink. This means that an image containing shadow data between ninety percent and 100% looses detail, resulting in many shadows appearing the same. Determining the primary toners or inks end points effectively detects where asking for more toner or ink no longer makes a difference.

The difference between the lightest and darkest points of the primary toners or inks determines the dynamic range for a printer at a given point in time. The behavior of a printer between the two end points of the black toner or ink, or its tone response, is found by first printing a gradation of black ink circles at the printer's natural resolution against a background made of coarse black dots 45 (refer to FIG. 1). Then the user locates the circle with the gray that best matches the gray of the black background pattern. This helps determine the black tone response of the printer, that is the black only channel input required to generate a pre-determined amount of lightness as the goal. The presently preferred embodiment, shown in FIG. 1, uses a 30% dot coverage background.

The second target of the preferred embodiment of the calibration process, referred to herein as the "Gray Balance page," compares the pure 30% black toner or ink with grays made of cyan, magenta, and yellow toners or inks. The comparison provides data for calculated corrections to the images that compensate for a printer's deviation from its standard, theoretical behavior, e.g. using the Limits page, if a black channel tone response determination is made, the results of the black channel tone response are propagated into the target that is printed for C,M,Y value determination, i.e., the Gray Balance page.

Figure 2:
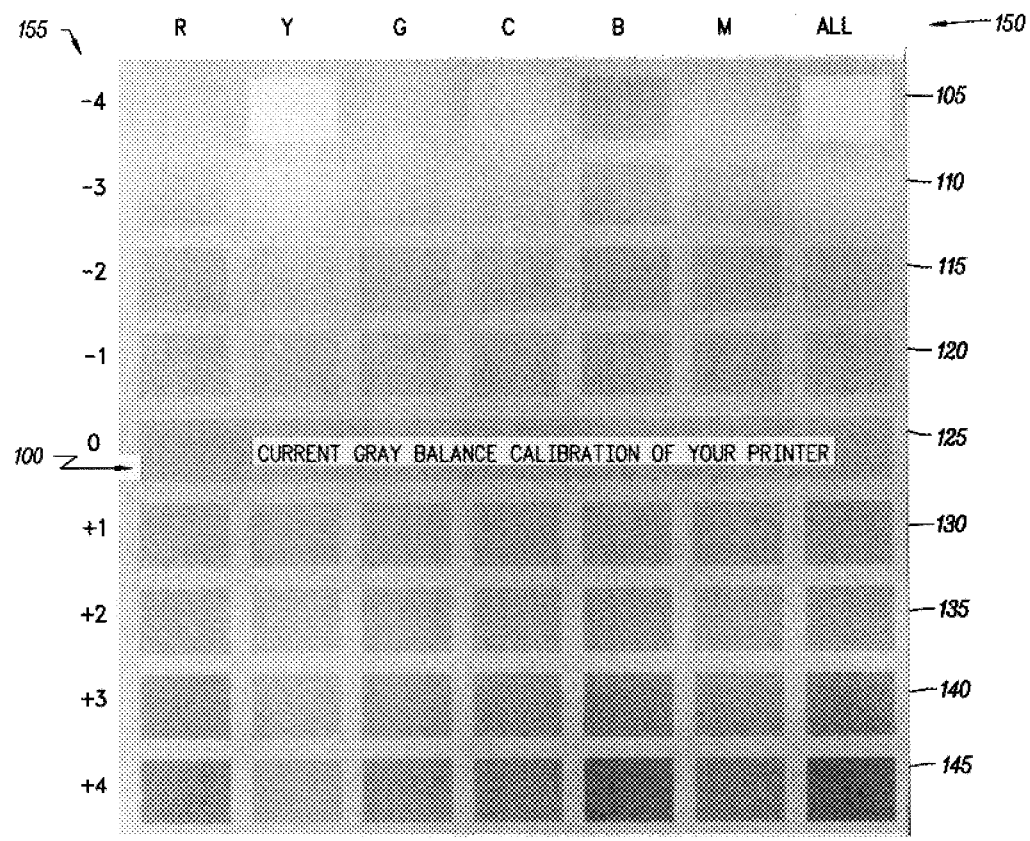
FIG. 2 is a second target layout which compares a pure 30% blacking with grays made of cyan, magenta and yellow inks (no black)

Referring to FIG. 2, the Gray Balance page uses the 30% black value found in the Limits page to print a frame of pure black toner or ink located around patches to provide a border, herein referred to as background gray 100 at the printer's resolution. The Gray Balance page could use other percentage black values found in the Limits page to print the background gray. Thirty percent is used in the preferred embodiment of the invention because it is lighter and visually important. The goal is to find a mixture of CMY toners or inks that return a best gray at the same lightness as 100. Grays are very difficult to reproduce with colored inks only. The presently preferred embodiment of the following process is iterative. First, the C,M,Y gray of the printer is a patch printed at the center of the target, 125. The C,M,Y variations of the gray are located around the central patch. Each column of patches represents a change in hue except the last column of patches which represents only a change in the brightness, 150. Rows of patches represent changes in saturation, 105, 110, 115, 120, 130, 135, 140, and 145. The farther the row of a patch is, in one direction from the center C,M,Y gray, the darker the color is. The farther the row of a patch is in the other direction from the center C,M,Y gray, the lighter the color is. The values of the toner or ink in the patches range from zero to 255 and are in powers of two including for example one, two, four, and eight. The patches are arranged in a sequence such that access to such values are provided as individual steps, reflecting the gradation from zero to 255.

The target layout has a central region and a peripheral region such that variations in toner or ink densities in the central region are less than the variations in toner or ink densities in the peripheral region. The location of these two regions enable a user to calibrate more quickly because the user can find a more accurate match with fewer iterations.

The user locates the color patch that best matches the gray that surrounds all the patches. The user enters a single row and a single column on a control panel, 150 and 155. Every time a color patch and brightness patch are selected, a new Gray Balance page is reprinted with the selected color patch as the middle patch, 125. This process is iterative and is repeated until an acceptable match is detected. Then the best patch is the middle patch, 125.

Then the behavior of cyan, magenta, and yellow toners or inks between their respective limit points and their relation to the black toner or ink drift are calculated. The end result is a set of four transfer curves that act upon the input and output of the individual cyan, magenta, yellow and black channels.

The invention can be extended to more than one target layout page with different background grays such that for each one of these grays a user can find a CMY combination to match the background gray. The extension might provide a more accurate calibration at the cost of the user having to spend more time performing the calibration.

Figure 3A:
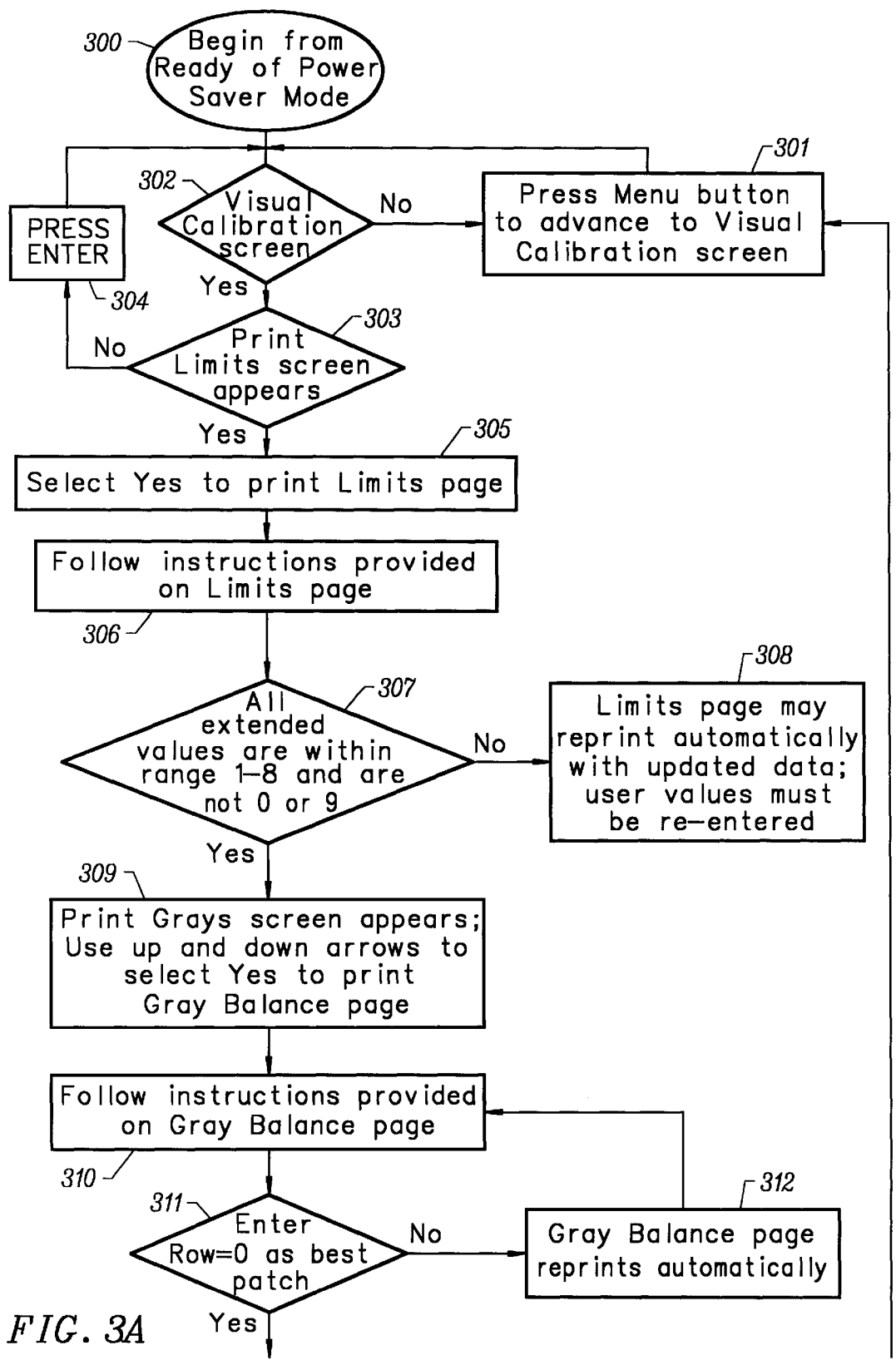
FIGS. 3a and 3b provide a flow diagram illustrating the complete set of steps of the calibration method.
Figure 3B:
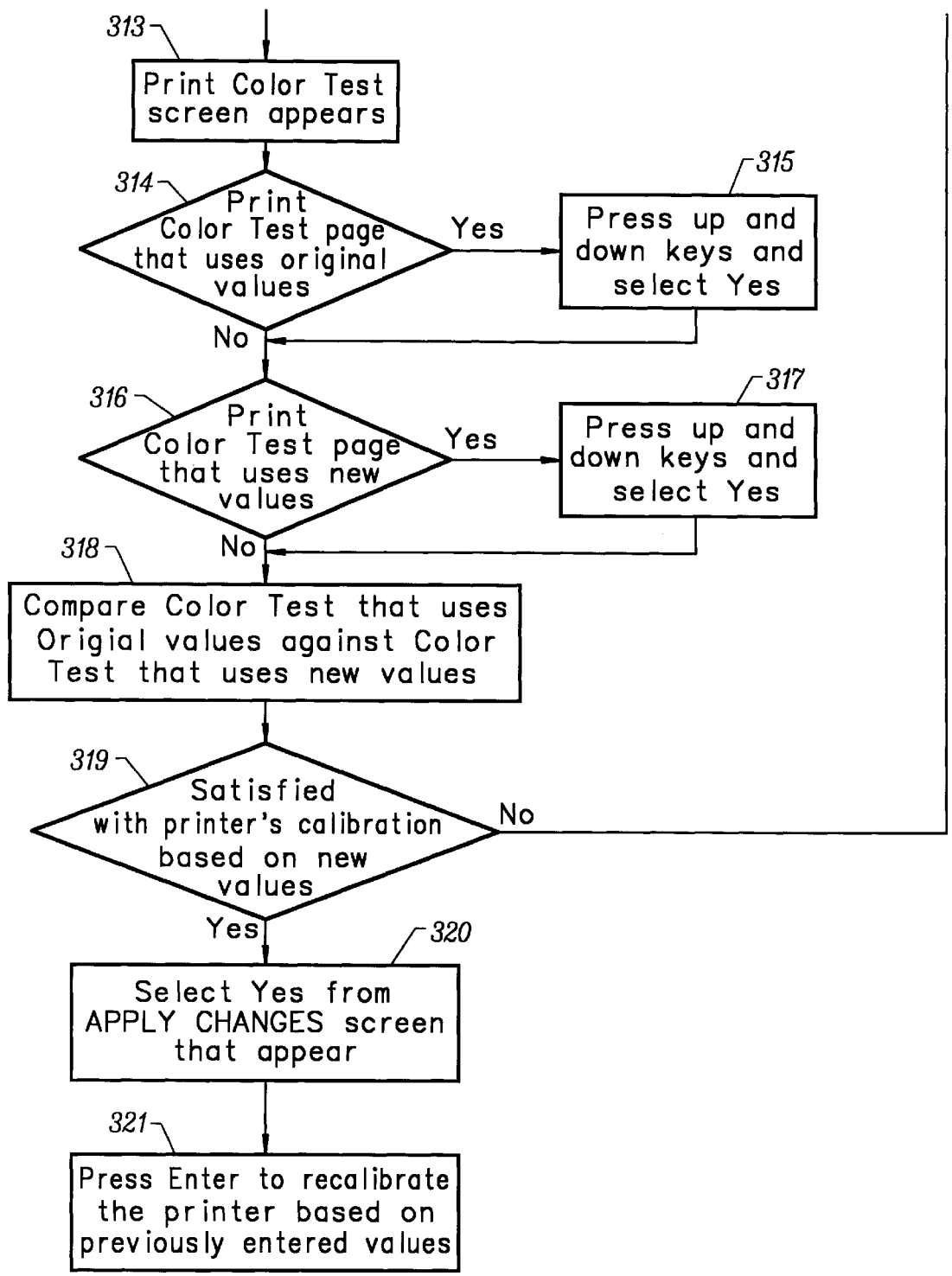

FIGS. 3a and 3b provide a flow diagram illustrating a complete set of steps of the presently preferred calibration method. The presently preferred procedure herein is performed on a printer operation panel. From the Ready or Power Saver Mode (300) a user presses the Menu button repeatedly (301) to advance to the Visual Calibration screen (302). To advance to the Print Limits screen (303) the user presses Enter (304). To print the Limits page the user presses the up and down arrow keys and selects Yes (305). To reset the printer's toner or ink tone response, the user follows the instructions provided on the Limits page (306). Zero and nine are out of range values for the calibration. If any of the entered values for any color are zero or nine (307) the Limits page may be reprinted automatically (308). When all values are entered, the Print Grays screen appears (309). The user presses the up and down arrow keys and selects Yes (309) to print the Gray Balance page. To adjust the printer's gray balance, the user follows the instructions provided on the Gray Balance page (310). The page is reprinted until the user enters the middle row as the best patch (311, 312). When the entered values are satisfactory the Print Color Test screen appears (313). To print a Color Test page that uses the original values and a Color Test page that uses new values, the user presses the up and down arrow keys and selects Yes (314, 315, 316, 317). The user compares the Color Test page using the original calibration values with the Color Test page using the new calibration values (316). When satisfied with the results, the user selects Yes from the APPLY CHANGES screen (319, 320) and presses Enter to recalibrate the printer based on the previously entered values (321).

Figure 4:
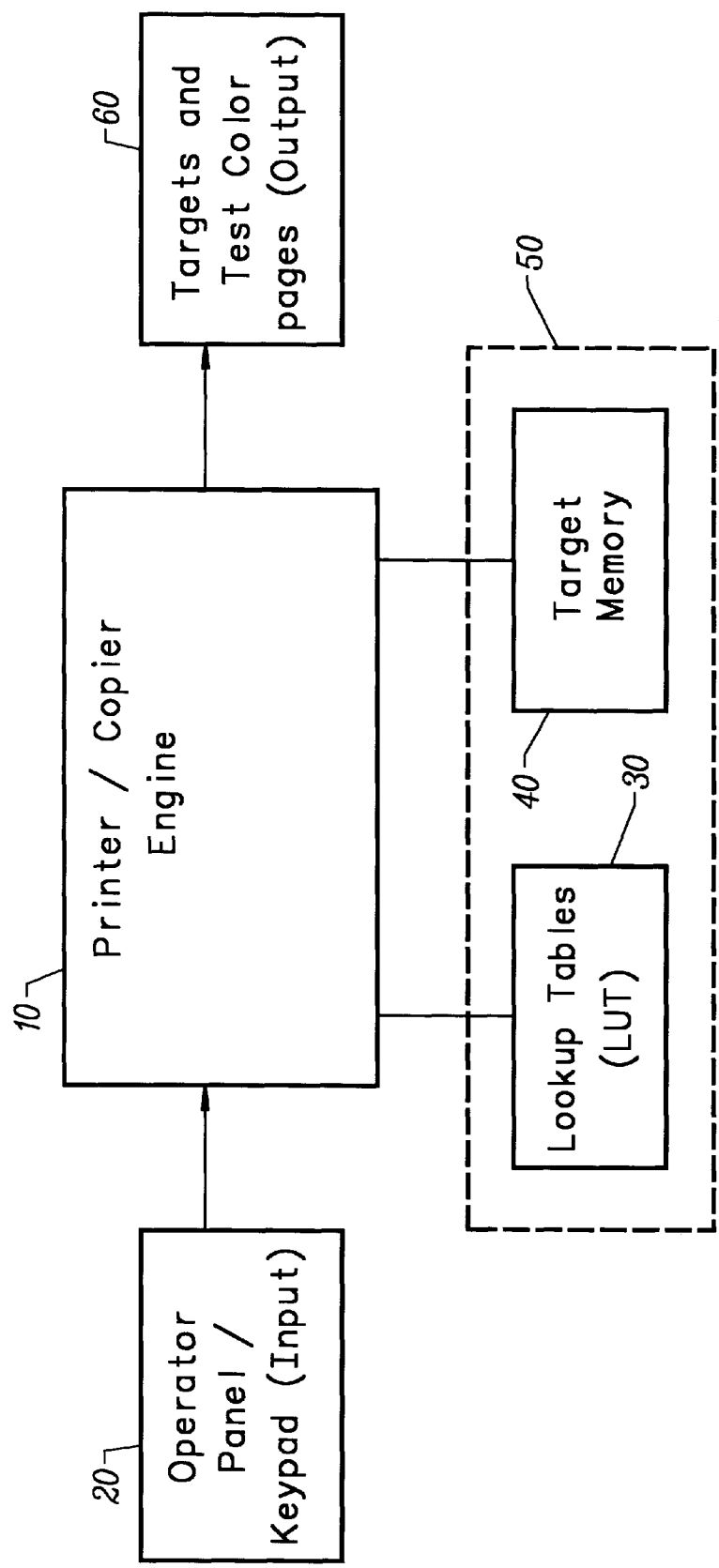
FIG. 4 is a view of a printer display according to the invention.

FIG. 4 is a view of a printer display according to the invention. Presently the calibration is performed on a printer 10 but it could be performed on any printing technology including, for example a copier, a printing press, and any other such device. Typically data is input to the printer engine through a device such as for example an operator panel or keypad 20. The data is typically processed in a printer engine 10 and some results stored in lookup tables (LUT) 30. The target memory 40 stores copies of the Limits page and Gray Balance page for printing. According to the presently preferred embodiment of the invention the LUT and target memory 50 reside in the printer. They could also reside in related machines such as for example a computer or server. Targets and Test Color pages are output 60 that provide timely feedback to the calibration procedure.

Figure 5:
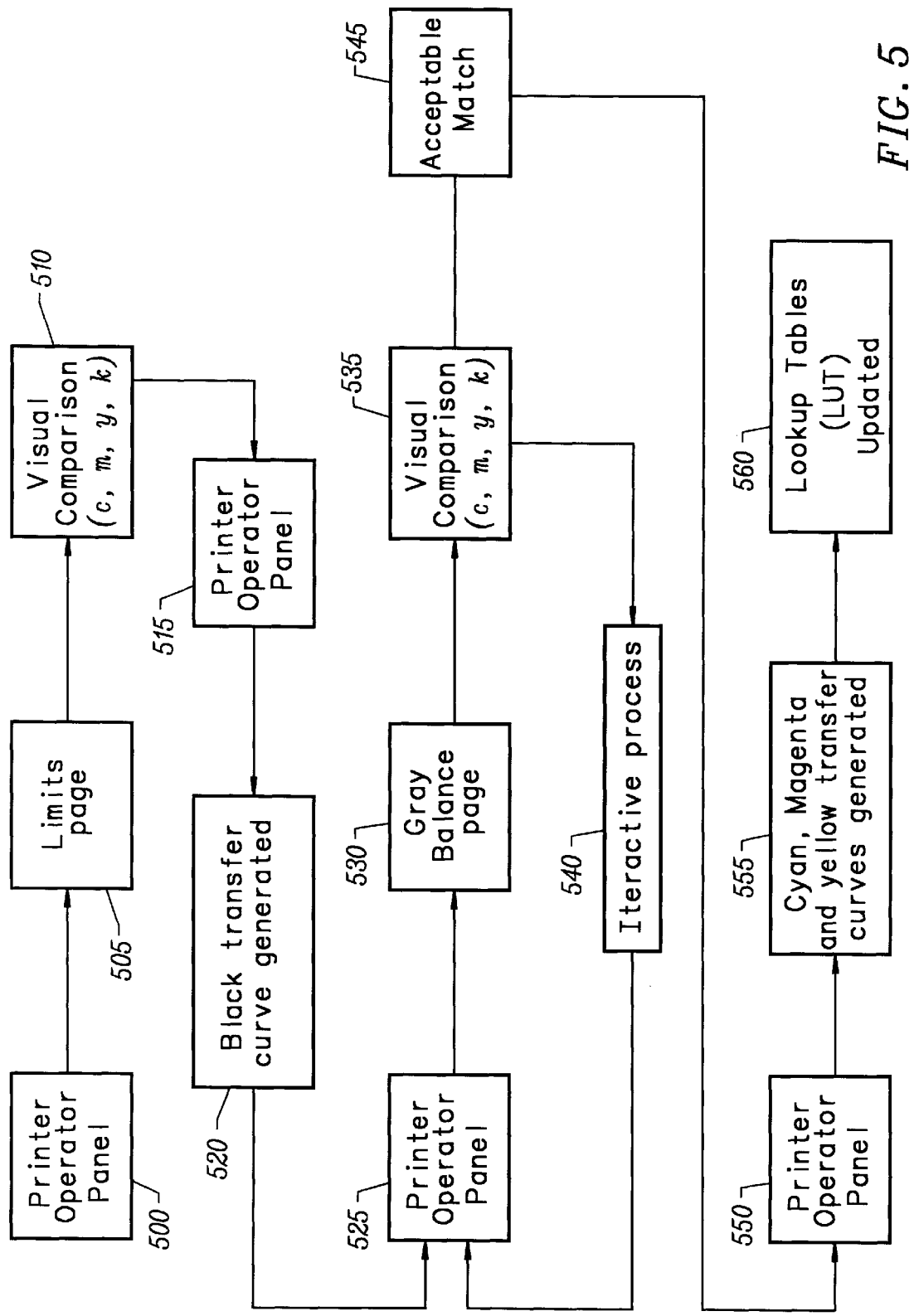
FIG. 5 is a block flow diagram showing the steps of the calibration method according to the invention.

FIG. 5 is a block flow diagram showing the steps of the calibration method according to the invention. First a user requests the Limits page to print by entering data through an input device (500 and 505). The user visually compares the color densities for the primary toners or inks (510). The user enters values indicating the lightest and darkest ink spots that can be distinguished from the background and the ink spot that best matches a 30% density. From this data, the black transfer curve is generated (515 and 520). The user then requests the Gray Balance page to print (525 and 530). The user visually compares a gray color made from corrected black (520) with grays made from cyan, magenta, and yellow mixtures (535). This is an iterative process (540). The user tells the printer a match is acceptable through the printer operator panel (545 and 550). The remaining three transfer curves are calculated (555) and the LUT is updated (560).

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

What is claimed is:

1. A method for calibrating a color printing device, such as a color printer, including the steps of:

printing a first target layout, which includes graduated primary color toner or ink patches to detect a printing device's primary color start and end points and graduated black toner or ink circles to detect a printing device's percentage dot gain;

comparing visually said primary color toner or ink patches and said black toner or ink patches and choosing the said primary toner or ink start and end points and said black toner or ink tone response;

generating a black transfer curve using said black start and end points and said black tone response, thereby finding the function that compensates for the drift in the printing device;

printing a second target layout, which incorporates said black transfer curve as background gray and includes patches of gray made of mixtures of primary color toners or inks such as for example cyan, magenta, and yellow inks (CMY);

comparing visually said background gray with said CMY grays and choosing best match from said CMY patches;

performing said comparison of background gray to CMY gray patches in an iterative process until acceptable match is found;

generating transfer curves for primary toners or inks using above said start and end points and said black transfer curve, thereby finding functions that compensate for the drift of the primary colors of the printing device; and updating each one-dimensional lookup table (LUT) with said compensating functions.

2. A method for calibrating a color printing device as in claim 1, wherein a visual comparison can be performed by any user, not necessarily an experienced user.

3. A method for calibrating a color printing device as in claim 1, wherein a goal toner or ink density can be arbitrarily chosen or generated from an ICC (International Color Consortium) profile.

4. A method for calibrating a color printing device as in claim 1, wherein said iterative process can be as good as desired by a user in the sense of coarse or fine iterations.

5. A method for calibrating a color printing device as in claim 1, wherein intelligent variations for a goal toner or ink density can be generated by a user to correct an error.

6. A target layout as defined in claim 1, wherein graduated primary color ink patches are included to detect a printing device's primary color start and end points and graduated black toner or ink patches are included to detect a printing device's black channel tone response.

7. A target layout as defined in claim 1, wherein said black transfer curve is incorporated as background gray and said patches of CMY gray are included to detect said acceptable match.

8. A target layout as defined in claim 1, comprising:
 a main color patch being evaluated such that said main color patch is located in the center of said target layout;
 a plurality of patches of variations such that said plurality of patches is located around said main patch;
 a plurality of rows of patches such that the farther a row of a patch is, in one direction from an evaluated color, the darker the colors the row represents are;
 a plurality of rows of patches such that the farther a row of a patch is, in another direction from an evaluated color, the lighter the colors the row represents are;
 a plurality of columns of patches, wherein one column addresses variations only in brightness and the other columns address hues variation;
 a plurality of columns of patches, wherein every primary hue is addressed; and
 a frame of pure black toner or ink such that said frame is located around said patches in such a way as to provide a border around said patches.

9. Color patches as defined in claim 8, further comprising:
 toner or ink values within a range from zero to 255;
 individual steps of said toner or ink values, wherein said steps are a gradation of positive powers of two including for example one, two, four, and eight; and
 an arrangement such that said toner or ink values are in a sequence that allow access to said individual steps in said gradation.

10. A target layout as defined in claim 1, further comprising:
 a central region of patches wherein a toner or ink value from a first patch in said region may vary with a toner or ink value of a second patch in said region; and
 a peripheral region of patches wherein a toner or ink value from a first patch in said region may vary with a toner or ink value of a second patch in said region.

11. A central region and a peripheral region as defined in claim 10, further comprising:
 a variation between said first patch and said second patch in said central region that is less than a variation between said first patch and said second in said periphery region; and
 means for quick calibration to a more accurate match with fewer iterations.

12. A method as in claim 1, wherein the step of printing a second target layout further comprises a plurality of target layouts, each layout having different background grays such that for each one of those grays a CMY match can be found.

13. A method as in claim 1, wherein the method is compatible with densitometer calibration.

14. A method as in claim 1, wherein the method does not require a preexisting reference target.

15. A method of performing a calibration on a printing device including the steps of:
 requesting from an input device to advance to a visual calibration screen;
 requesting to print first target page from said input device;
 following instructions provided on said target page to input values representing primary color toner or ink limits and black percentage;
 requesting to print second target page from said input device;
 following instructions provided on said second target page to input values representing the best patch of CMY gray;
 performing above steps iteratively until an acceptable match is found;
 printing a color test page that uses the original calibration values;
 printing a color test page that uses the new calibration values; and
 accepting said new calibration values by providing input value or values into said input device to said printing device.

16. A method of performing a calibration on a printing device as in claim 15 wherein the steps of requesting to print a first and second target page can be extended to requesting to print a plurality of first target pages and requesting to print a plurality of second target pages.

17. A method of performing a calibration on a printing device as in claim 15 wherein the step of performing said previous steps iteratively further comprises a plurality of iterations as good as desired by a user in the sense of coarse or fine iterations.

18. A method of performing a calibration on a printing device as in claim 15 wherein intelligent variations for a goal toner or ink density can be generated by a user to correct an error.

19. An apparatus for calibrating a color printing device, comprising:
 a first target layout, which includes graduated primary color toner or ink patches to detect a printing device's primary color start and end points and graduated black toner or ink patches to detect a printing device's black channel tone response, wherein a user compares visually said primary color toner or ink patches and said black toner or ink patches and chooses said primary toner or ink start and end points and said black toner or ink tone response;
 means for generating a black transfer curve using said black start and end points and said tone response, thereby finding a function that compensates for the drift in said color printing device;
 a second target layout, which incorporates said black transfer curve as background gray and includes patches of gray made of mixtures of primary color toners or inks such as for example cyan, magenta, and yellow inks (CMY), wherein a user compares visually said background gray with said CMY grays and chooses a best match from said CMY patches;
 wherein said comparison of background gray to CMY gray patches is an iterative process that is performed until an acceptable match is found;
 means for generating transfer curves for primary toners or inks using above said start and end points and said black transfer curve, thereby finding functions that compensate for the drift of the primary colors of the printing device; and
 means for updating each one-dimensional lookup table (LUT) with said compensating functions.

20. An apparatus for calibrating a color printing device as in claim 19, further comprising a plurality of target layouts, each layout having different background gray values such that for each one of those grays a CMY match can be found.

21. An apparatus for calibrating a color printing device as in claim 19, wherein said iterative process can be as good as desired by a user in the sense of coarse or fine iterations.

22. An apparatus for calibrating a color printing device as in claim 19, wherein said visual comparison can be performed by any user, not necessarily an experienced user.

23. An apparatus for calibrating a color printing device as in claim 19, wherein said toner or ink density with which said visual comparison is made can be arbitrarily chosen or generated from an ICC.

24. An apparatus for calibrating a color printing device as in claim 19, wherein said apparatus does not require preexisting reference targets.

25. An apparatus for calibrating a color printing device as in claim 19, wherein said apparatus is compatible with a densitometer.

26. An apparatus for calibrating a color printing device as in claim 19, wherein intelligent variations for a goal toner or ink density can be generated by a user to correct an error.

27. An apparatus to perform a calibration on a printing device, comprising:
   an input device to advance to a visual calibration screen, wherein a user may request from said input device that a first target page be printed;
   wherein instructions are provided on said target page to input values representing primary color toner or ink limits and black percentage;
   wherein a user may request from said input device that a second target page be printed;
   wherein instructions are provided on said second target page to input values representing the best patch of CMY gray;
   wherein said above steps may be performed iteratively until an acceptable appearance match is found;
   a printing device for printing a color test page that uses the original calibration values, wherein said printing device prints a color test page that uses the new calibration values; and
   means for accepting said new calibration values by providing input values into said input device to said printing device.

28. An apparatus to perform a calibration on a printing device as in claim 27, wherein a user may request from said input device a plurality of first target pages be printed and a plurality of second target pages be printed.

29. An apparatus to perform a calibration on a printing device as in claim 27, wherein said iteratively performed steps can be as good as desired by said user in the sense of coarse or fine iterations.

* * * * *